United States Patent
Pudney et al.

(10) Patent No.: US 8,565,764 B2
(45) Date of Patent: Oct. 22, 2013

(54) TELECOMMUNICATIONS NETWORK ACCESS REJECTION

(75) Inventors: Christopher David Pudney, Newbury (GB); David Andrew Fox, Newbury (GB); Peter Howard, Newbury (GB)

(73) Assignee: Vodafone Intellectual Property Licensing Limited, Newbury, Berkshire (GB)

( * ) Notice: Subject to any disclaimer, the term of this patent is extended or adjusted under 35 U.S.C. 154(b) by 441 days.

(21) Appl. No.: 12/653,395

(22) Filed: Dec. 11, 2009

(65) Prior Publication Data
US 2010/0190497 A1   Jul. 29, 2010

(30) Foreign Application Priority Data
Dec. 11, 2008   (GB) .................................. 0822599.7

(51) Int. Cl.
*H04W 4/00*   (2009.01)
(52) U.S. Cl.
USPC ...................... 455/435.1; 455/510; 455/432.1; 455/433; 455/411; 455/558
(58) Field of Classification Search
USPC ............ 455/432.1, 433, 435.1, 440, 558, 510
See application file for complete search history.

(56) References Cited

U.S. PATENT DOCUMENTS

| 6,125,283 A * | 9/2000 | Kolev et al. ................. 455/552.1 |
| 6,356,755 B1 * | 3/2002 | Valentine et al. .......... 455/435.1 |
| 6,493,552 B1 * | 12/2002 | Hicks ......................... 455/435.2 |
| 6,785,228 B1 * | 8/2004 | Vandette et al. ............. 370/230 |
| 7,561,891 B2 * | 7/2009 | Cormier et al. .............. 455/510 |
| 7,792,530 B2 * | 9/2010 | Tariq et al. .................... 455/436 |
| 7,974,624 B2 * | 7/2011 | Gallagher et al. ......... 455/435.1 |
| 2002/0046339 A1 * | 4/2002 | Bellare et al. ................. 713/170 |
| 2002/0058494 A1 * | 5/2002 | Timonen et al. .............. 455/405 |
| 2003/0045289 A1 * | 3/2003 | Zhao et al. .................... 455/435 |
| 2003/0200433 A1 * | 10/2003 | Stirbu ........................... 713/169 |
| 2004/0236852 A1 * | 11/2004 | Birkestrand et al. .......... 709/226 |
| 2005/0130659 A1 * | 6/2005 | Grech et al. .................... 455/436 |
| 2005/0227720 A1 * | 10/2005 | Gunaratnam et al. ........ 455/510 |
| 2005/0228874 A1 * | 10/2005 | Edgett et al. .................. 709/220 |
| 2006/0020783 A1 * | 1/2006 | Fisher ........................... 713/156 |
| 2006/0034278 A1 * | 2/2006 | Hundscheidt et al. ........ 370/390 |
| 2006/0063544 A1 * | 3/2006 | Zhao et al. .................... 455/510 |
| 2007/0142094 A1 * | 6/2007 | Enns et al. .................... 455/566 |
| 2007/0270152 A1 * | 11/2007 | Nylander et al. ............. 455/445 |

(Continued)

OTHER PUBLICATIONS

3GPP TS 23.236 V8.0.0 (Dec. 2008), 3rd Generation Partnership Project; Technical Specification Group Services and System Aspects; Intra-domain connection of Radio Access Network (RAN) nodes to multiple Core Network (CN) nodes (Release 8), 38 pp.

*Primary Examiner* — Kamran Afshar
*Assistant Examiner* — Mong-Thuy Tran
(74) *Attorney, Agent, or Firm* — Muirhead and Saturnelli, LLC

(57) ABSTRACT

A method of controlling an attach procedure of a device 1 to a telecommunications network 140 following receipt of an attach rejection from the telecommunications network, the method including assessing the authenticity of the attach rejection, and selecting a criterion for performing a subsequent attach attempt by the device to the network in dependence upon the authenticity assessment. The authenticity may be assessed by determining whether the rejection was received by an authenticated communication link or a signed message. The authenticity may also be assessed by checking that the cause of the reject is consistent with information held by the device. The selected criterion may be power cycling of the device or the passage of a time period.

12 Claims, 9 Drawing Sheets

(56) References Cited

U.S. PATENT DOCUMENTS

| | | | |
|---|---|---|---|
| 2007/0287419 A1* | 12/2007 | Wang | 455/411 |
| 2008/0009318 A1* | 1/2008 | Evans | 455/558 |
| 2008/0039085 A1* | 2/2008 | Phan-Anh | 455/435.1 |
| 2008/0046745 A1* | 2/2008 | Buch et al. | 713/176 |
| 2008/0076412 A1* | 3/2008 | Khetawat et al. | 455/432.1 |
| 2008/0081622 A1* | 4/2008 | Gunaratnam et al. | 455/435.2 |
| 2008/0096607 A1* | 4/2008 | Lee | 455/558 |
| 2008/0207170 A1* | 8/2008 | Khetawat et al. | 455/411 |
| 2008/0220772 A1* | 9/2008 | Islam et al. | 455/432.2 |
| 2008/0254768 A1* | 10/2008 | Faccin | 455/411 |
| 2008/0304834 A1* | 12/2008 | Fan et al. | 398/137 |
| 2008/0305792 A1* | 12/2008 | Khetawat et al. | 455/435.1 |
| 2008/0318571 A1* | 12/2008 | Vikberg et al. | 455/435.2 |
| 2009/0017819 A1* | 1/2009 | Fox et al. | 455/435.1 |
| 2009/0064295 A1* | 3/2009 | Budampati et al. | 726/6 |
| 2009/0088211 A1* | 4/2009 | Kim | 455/558 |
| 2009/0137228 A1* | 5/2009 | Horn et al. | 455/411 |
| 2009/0150525 A1* | 6/2009 | Edgett et al. | 709/220 |
| 2010/0002582 A1* | 1/2010 | Luft et al. | 370/230.1 |
| 2010/0048208 A9* | 2/2010 | Gunaratnam et al. | 455/435.2 |
| 2010/0075658 A1* | 3/2010 | Hou et al. | 455/422.1 |
| 2010/0081434 A1* | 4/2010 | Ahluwalia | 455/435.1 |
| 2010/0291924 A1* | 11/2010 | Antrim et al. | 455/433 |
| 2011/0091036 A1* | 4/2011 | Norrman et al. | 380/44 |

* cited by examiner

TELECOMMUNICATIONS NETWORK ACCESS REJECTION

TECHNICAL FIELD

The present invention relates to a method of controlling an attach procedure of a device to a telecommunications network. The present invention further provides a telecommunications device for controlling an attach procedure of the device to a telecommunications network and a telecommunications system for controlling attachment of a telecommunications device to a telecommunications network.

BACKGROUND TO THE INVENTION

When a mobile device attempts to register on (attach to) a network and the registration fails, the network rejects the mobile device, frequently without completing authentication or ciphering. Conventionally, once such a rejection has been received, the mobile device will not attempt to attach to the network again until it is power cycled. This protects the network from repeated attach attempts.

It would, however, be advantageous to have a mechanism for attempting to verify that network rejections are issued properly under control of the network. It is an object of embodiments of the present invention to provide this.

SUMMARY OF THE INVENTION

According to a first aspect of the present invention, there is provided a method of controlling an attach procedure of a device to a telecommunications network following receipt of an attach rejection from the telecommunications network, the method including assessing the authenticity of the attach rejection, and selecting a criterion for performing a subsequent attach attempt by the device to the network in dependence upon the authenticity assessment.

The authenticity may be assessed by determining whether the rejection was received by an authenticated communication link or a signed message. The authenticity may also be assessed by checking that the cause of the reject is consistent with information held by the device. The selected criterion may be power cycling of the device, change of location or the passage of a time period.

For example, the method may include the step of determining the authenticity of the attach rejection in dependence upon whether the attach rejection was received via an authenticated communication link between the device and the network. For example, a communication link could be authenticated by ciphering and/or integrity protection of the link. This could be facilitated by a challenge and response exchange between the device and the telecommunications network.

By way of example, the telecommunications network may be a visited telecommunications network, whereas the device is registered with a different telecommunications network as its home network. If there is an agreement (for example a roaming agreement) between the visited telecommunications network and the home network, authentication of the link is generally possible. On the other hand, if there is no such roaming agreement, the establishment of such an authenticated link is conventionally not possible. An aspect of the present invention advantageously provides a hub which connects the visited telecommunications network to an authentication server of the home network to enable establishment of the authenticated communication link.

The method may include the step of determining the authenticity of the attach rejection in dependence upon whether there is a trust relationship between the device and the network. For example, such a trust relationship could be established by the attach rejection message being signed by the network, which signature is verifiable by the device. For example, that signature could be verifiable by the device being provided with a public certificate.

The attach rejection from the telecommunications network may include a rejection cause indicator, and the method may further include determining the authenticity of the attach rejection by verifying the rejection cause indicator.

The rejection cause indicator may indicate that the device is not allowed to operate in the telecommunications network, and the step of verifying the rejection cause indicator may then include comparing the network indicated in the rejection cause indicator with a list of pre-stored networks at the device (which term may include the device and the SIM associated therewith).

The rejection cause indicator may alternatively indicate that the device lacks a subscriber identification module, SIM, and the step of verifying the rejection cause indicator may then include determining at the device whether the subscriber identification module is in fact present.

The criterion for performing a subsequent attach attempt may include the occurrence of a particular event. For example, the event may be the power cycling of the device. This criterion may be applied if the authenticity assessment is negative.

The criterion for performing a subsequent attach attempt may include the passage of a time period or movement by a minimum distance. This criterion may be selected when the authenticity assessment is positive.

According to a second aspect of the present invention, there is provided a method of controlling attachment of a telecommunications device to a telecommunications network, the method including establishing a trust relationship between the device and the network prior to accepting or rejecting an attachment request from the device. This is in contrast to conventional arrangements in, for example, GSM or UMTS networks, where an attach request from a device is accepted or rejected prior to the establishment of a trust relationship. The establishment of a trust relationship prior to receipt of the rejection of an attachment request provides verification that the attachment request rejection is legitimate and not a bogus attachment request rejection.

The step of establishing the trust relationship may include determining whether the device and/or the network include predetermined secret information. For example, this information may be a certificate provided by one of the device and the network, which is verifiable by information held by the other of the device and the network. For example, a signed message may be verified using a public certificate.

The step of establishing the trust relationship may include establishing an authenticated communication link between the device and the network. The communication link may be ciphered and/or integrity protected. The communication link may be authenticated in the case of a GSM, UMTS or LTE communications network, by performing SIM authentication in the known manner—but prior to accepting or rejecting the attachment request from the device. Such SIM authentication requires the sharing of common key information and common algorithms between the device (which includes the SIM associated therewith) and the network.

The present invention further provides a telecommunications device and a telecommunications system as defined in the dependent claims.

BRIEF DESCRIPTION OF THE DRAWINGS

For a better understanding of the present invention, embodiments will now be described by way of example with reference to the accompanying drawings, in which.

In the drawings like elements are generally designated with the same reference sign.

DETAILED DESCRIPTION OF PREFERRED EMBODIMENTS

Figure 1:
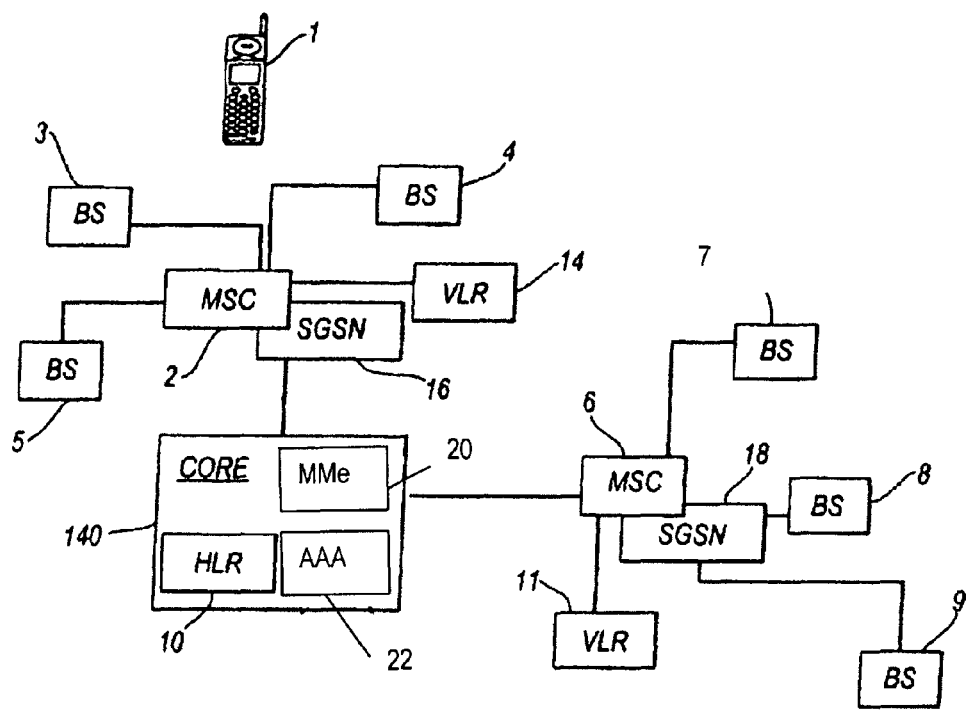
FIG. 1 is a diagrammatic drawing of key elements of a mobile telecommunications network.

Key elements of a mobile telecommunications network, and its operation, will now briefly be described with reference to FIG. 1.

Each base station (BS) corresponds to a cell of its cellular or mobile telecommunications network and receives calls from and transmits calls to a mobile device in that cell by wireless radio communication in one or both of the circuit switched or packet switched domains. Such a subscriber's mobile device is shown at 1. The mobile device may be a handheld mobile telephone.

In a GSM mobile telecommunications network, each base station comprises a base transceiver station (BTS) and a base station controller (BSC). A BSC may control more than one BTS. The BTSs and BSCs comprise the radio access network (RAN).

In a UMTS mobile telecommunications network, each base station comprises a node B and a radio network controller (RNC). An RNC may control more than one node B. The node B's and RNC's comprise the radio access network (RAN).

In the proposed LTE mobile telecommunications network, each base station comprises an eNode B. The base stations are arranged in groups, and each group of base stations is controlled by a Mobility Management Entity (MME) and a User Plane Entity (UPE).

Conventionally, the base stations are arranged in groups and each group of base stations is controlled by one node, such as a mobile switching centre (MSC), e.g. MSC 2 for base stations 3, 4 and 5. As shown in FIG. 1, the network has another MSC 6, which is controlling a further three base stations 7, 8 and 9. In practice, the network will incorporate many more MSCs and base stations than shown in FIG. 1. The base stations 3, 4, 5, 7, 8 and 9 each have dedicated connection to their MSC 2 or MSC 6—typically a cable connection.

The MSCs 2 and 6 support communications in the circuit switched domain—typically voice calls. Corresponding SGSNs 16 and 18 are provided to support communications in the packet switched domain—such as GPRS data transmissions. The SGSNs 16 and 18 function in an analogous way to the MSCs 2 and 6. The SGSNs 16, 18 are equipped with an equivalent to the VLRs 11, 14 used in the packet switched domain.

Each subscriber to the network is provided with a smart card or SIM/USIM which, when associated with the user's mobile device identifies the subscriber to the network. The mobile device and the SIM together are referred to as User Equipment (UE) 1. The SIM card is pre-programmed with a unique identification number, the "International Mobile Subscriber Identity" (IMSI) that is not visible on the card and is not known to the subscriber. The subscriber is issued with a publicly known number, that is, the subscriber's telephone number, by means of which callers initiate calls to the subscriber. This number is the MSISDN.

The network includes a home location register (HLR) 10 which, for each subscriber to the network, stores the IMSI and the corresponding MSISDN together with other subscriber data, such as the current or last known MSC or SGSN of the subscriber's mobile device.

When UE 1 is activated, it registers itself in (attaches itself to) the network by transmitting the IMSI (read from its associated SIM card) to the base station 3 associated with the particular cell in which the device 1 is located. In a traditional network, the base station 3 then transmits this IMSI to the MSC 2 with which the base station 3 is registered. In a network using the functionality described in 3GPP TS 23.236, the base station follows prescribed rules to select which MSC to use, and then transmits this IMSI to the selected MSC.

The mobile device 1 is provided with an International Mobile Equipment Identity (IMEI). An IMEI is a fifteen digit number that is allocated to a mobile device (or other) hardware, to uniquely identify that device. When the mobile device 1 registers with the network the IMEI of the mobile device 1 is also transmitted from the device 1 to the network.

MSC 2 now accesses the appropriate storage location in the HLR 10 present in the core network 140 and extracts the corresponding subscriber MSISDN and other subscriber data from the appropriate storage location, and stores it temporarily in a storage location in a visitor location register (VLR) 14. In this way, therefore the particular subscriber is effectively registered with a particular MSC (MSC 2), and the subscriber's information is temporarily stored in the VLR (VLR 14) associated with that MSC.

When these procedures are completed, the UE 1 is considered to be attached to the network.

Mobility Management entity (MMe) 20 controls mobility of devices within the network and routes requests from a UE to attach to the network from the RAN serving the UE to the network core 140.

When the HLR 10 is interrogated by the MSC 2 in the manner described above, an AAA (Access, Authorization, and Accounting) function 22 additionally performs an authentication procedure for the UE 1. The AAA 22 transmits authentication data to the MSC 2 in "challenge" and "response" forms. Using this data, MSC 2 passes a "challenge" to the UE 1 through base station 3. Upon receipt of this data, the UE 1 passes this data to its SIM and produces a "response" (RES). This response is generated using an encryption algorithm on the SIM and a unique Ki on the SIM. The response is transmitted back to the MSC 2 which checks it against its own information for the subscriber which checks it against information that it has obtained for that subscriber from the AAA 22 in order to complete the authentication process. If the response from the UE 1 is as expected, the UE 1 is deemed authenticated. At this point the MSC 2 requests subscription data from the HLR 10. The HLR 10 then passes the subscription data to the VLR 14. This authentication enables ciphering and integrity protection of traffic between the UE 1 and the core 140.

Communications between the UE 1 and the AAA 22 relating to authentication are transmitted via the MMe 20.

The authentication process will be repeated at regular intervals while the UE 1 remains activated and can also be repeated each time the UE makes or receives a call, if required.

Each of the MSCs of the network (MSC 2 and MSC 6) has a respective VLR (14 and 11) associated with it and operates in the same way as already described when a subscriber activates a UE in one of the cells corresponding to one of the base stations controlled by that MSC.

When the subscriber using UE 1 wishes to make a call, they enter the telephone number of the called party in the usual manner. This information is received by the base station 3 and passed on to MSC 2. MSC 2 routes the call towards the called party. By means of the information held in the VLR 14, MSC 2 can associate the call with a particular subscriber and thus record information for charging purposes.

Each SIM is specific to a particular network (the "home" network)—that is, it will have been issued under the control of the operator of that network and will be for use within that network. In many cases the SIM may permit roaming of the associated device into other, pre-recognised, networks.

As indicated above, when the UE 1 is in the home network, when the UE 1 registers on the network, the UE 1 performs authentication, and enables ciphering and integrity protection of traffic. The authentication process allows the accessed network and the UE 1 to authenticate each other.

Figure 2:
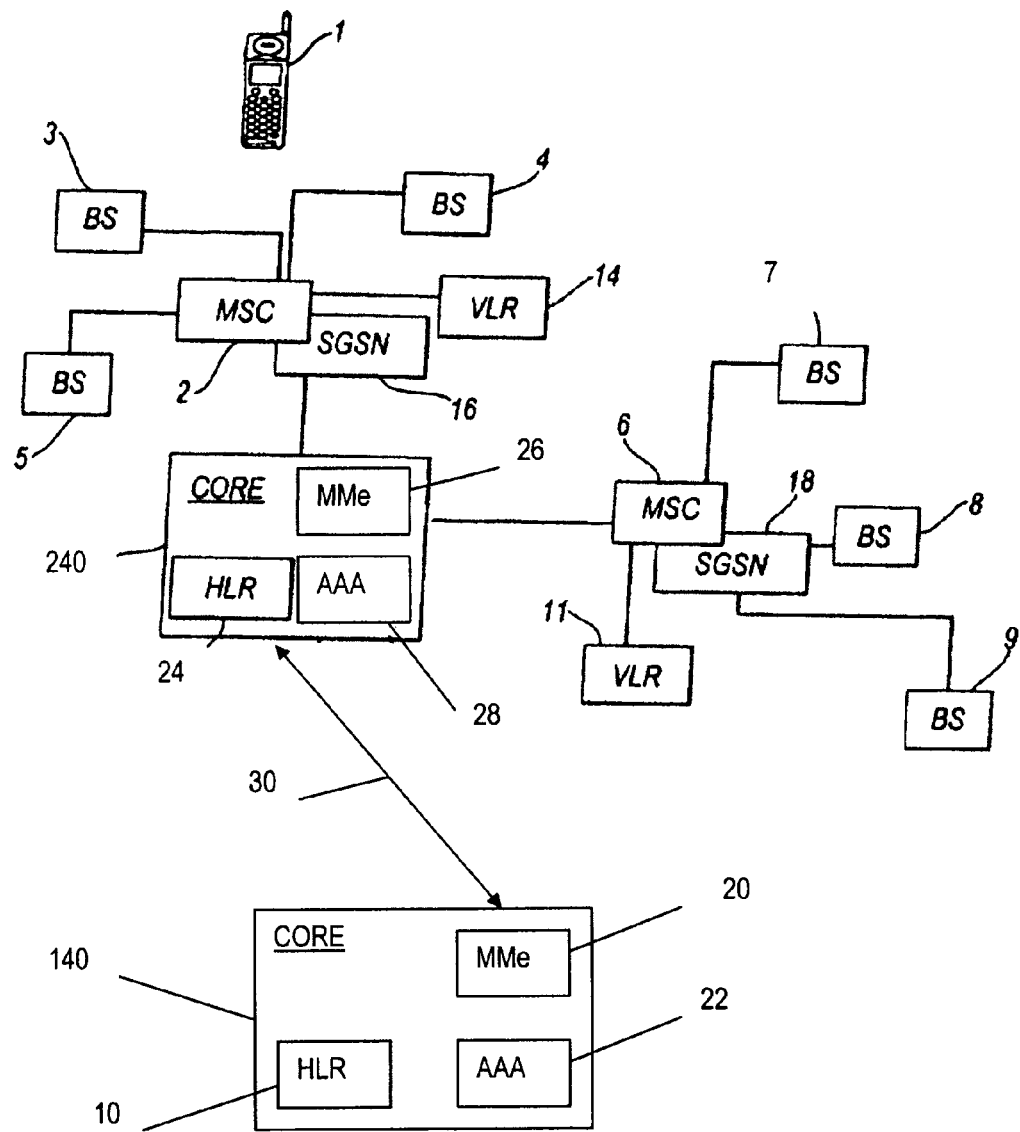
FIG. 2 is a diagrammatic drawing of key elements of a home mobile telecommunications network and a visited mobile telecommunications network.

FIG. 2 shows UE 1 when located in a visited network controlled by visited network core 240. The visited network has a HLR 24, MMe 26 and an AAA 28 corresponding to the like-named items in the home network controlled by home network core 140 of FIG. 1. The visited network and the home network are connected by link 30

When UE 1 attaches to the visited network, authentication is performed generally in the manner described above, but with the MMe 26 of the visited network communicating with the AAA 22 of the home network to exchange the "challenge" and "response".

In 3GPP (for example), network security is based on a trust relationship between Mobility Management entity 26 of the visited network and the Home Authentication Authorisation Accounting (AAA) entity of the home network (AAA 22), so if the UE 1 is successfully authenticated by a Mobility Management entity 26 in the Visited network, the UE 1 can assume that the Visited network is trusted by the Home AAA 22, as the Home AAA 22 trusts this Visited network enough to pass the subscriber information.

A network requires the ability to reject an attach attempt of a UE 1 in a number of scenarios, to both protect the network operation, as well as to enable different charging and operating models.

A rejection may be a persistent rejection or a non-persistent rejection. When a persistent rejection is received by a UE, further attach attempts by the UE are not permitted until the UE has been power cycled (or some other significant event has occurred). When a non-persistent rejection is received by a UE, further attach attempts by the UE are permitted without requiring power to be cycled but may only be allowed when a certain criterion is met (such as the passage of a period of time, or a significant change in location).

The following are some rejection types where authentication is possible by the network (although currently authentication does not occur if an attach request is rejected):

A1: Stolen Equipment—When a (U)SIM card or a mobile device (containing a (U)SIM) is stolen the associated identity is entered on a blacklist within the Home network (or visited network in the case of the IMEI). As part of the authentication process this device/SIM is barred from accessing the network.

A2: Misbehaving Equipment—When a UE, which is known to be non-conformant to the Standards, accesses a network, the network operator needs to be able to silence this misbehaving UE.

A3: Unpaid bills—When a subscriber attempts to access the network and the subscriber has not paid its bill, the network operator may want to bar the UE access to the network (as an alternative to hot-lining to a top-up website).

A4: Location-specific subscriptions—When subscription is only allowed in a subset of network, e.g. due to it being a fixed subscriber, or because one part of the network is out-of-bounds, the network needs to be able to inform the subscriber that it should not access in this part of the network.

A5: Location-specific roaming—When two operators enter into a network sharing arrangement, in some deployments only part of the network is to be shared, e.g. the rural coverage, and in the other the networks are not shared. The UE needs to be informed when accessing in an area that is not shared, that it cannot use this network in this area, but in other areas the UE may request access from this network.

A6: Network Overload—When the network is temporary overloaded, a UE attempting to register may need to be informed that it should try again in a short time.

For these types of rejection it would in theory be possible for the UE 1 to be authenticated by the home AAA 22 because the UE 1 can communicate with its home AAA 22. Conventionally, when rejections A1 to A6 are made, no authentication of the UE 1 occurs. According to an embodiment of the present invention, the procedure for UE 1 attachment to the MMe 26 of the visited network is changed so that an attach reject message is sent after ciphering and integrity protection have been enabled between the UE 1 and the MMe 26 (this is in contrast to known arrangements in which ciphering and integrity protection are not performed before an attached reject message is issued).

According to this embodiment the UE 1 or SIM thereof may be modified to include a parameter which is configured by the network operator to indicate whether it is mandatory for these rejection types to be received only after the link between the UE 1 and the MMe 26 is secured. The UE 1 or SIM could be configured such that a different action is taken in dependence upon whether the reject message is received via a secured link or via an unsecured link. For example, an attach reject message received via a secured link may be treated as a persistent rejection, whereas an attach reject message received via an unsecured link may be treated as a non-persistent rejection.

Figure 3:
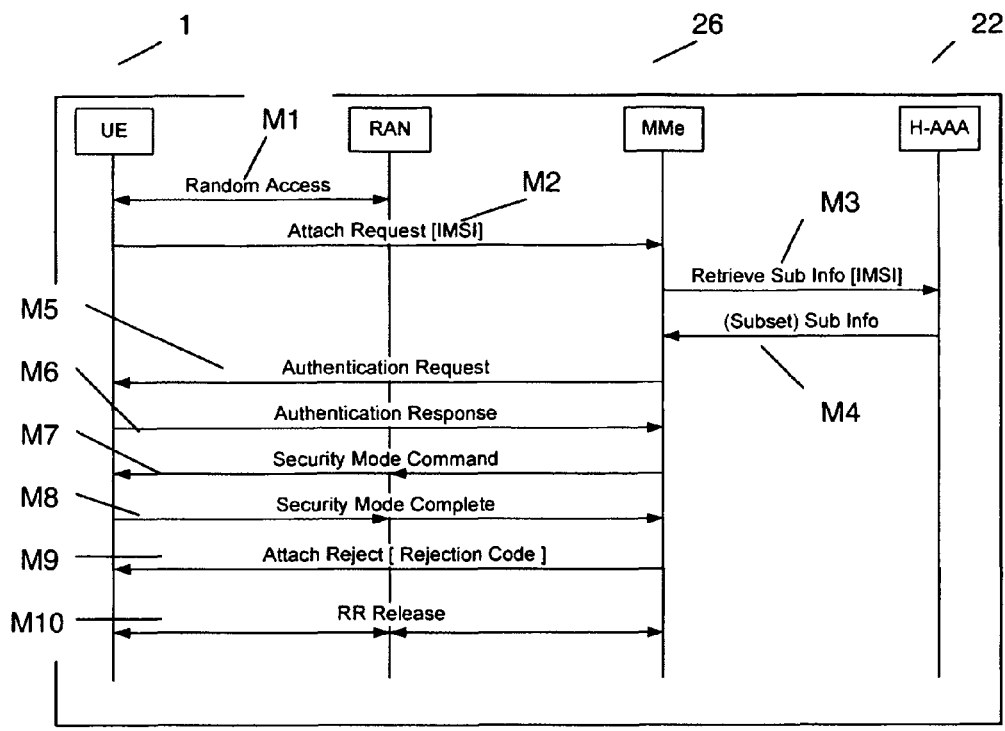
FIG. 3 shows the messages transmitted between the mobile device, RAN, MMe and home AAA (H-AAA) according to a first embodiment of the invention in which authentication is possible between the mobile device and the home AAA.

FIG. 3 shows the messages transmitted between the UE 1, RAN, MMe 26 and home AAA 22 (H-AAA).

At message M1 the UE 1 transmits a random access message to the RAN. At message M2 UE 1 transmits an attach request via the RAN to the MMe 26. The attach request message M2 includes the IMSI of the SIM associated with the UE 1. In message M3 the MMe 26 transmits a request for subscription information to the home AAA 22, which message includes the IMSI. In message M4 the home AAA returns to the MMe 26 a subset of the subscriber information held, which is sufficient to allow ciphering and integrity protection. At message M5 the MMe 26 transmits an authentication request message via the RAN to the UE 1. This message is transmitted for the purposes of performing authentication to ensure that the UE 1 is genuine. The message includes a "challenge" with an authentication token and RAND. The UE 1 computes a "response" (RES) and sends this to the MMe 26 via the RAN in message M6. Using information obtained from the home AAA 22, the MMe 26 then compares the response RES with the expected response XRES. If they are the same, the UE 1 is considered to be authenticated. In message M7 the MMe 26 sends a security mode command to the UE 1 via the RAN. The security mode command instructs the UE 1 to start ciphering and integrity protection, or just integrity protection—ciphering being optional. (The UE 1 and the MMe 26 have common algorithms to allow ciphering and integrity protection therebetween.) The UE 1 then, after configuring ciphering and integrity protection, responds back to the network. The response message is a security mode complete message, M8. Message M8 is integrity protected. The ciphering mode complete message M8 is transmitted via the RAN to the MMe 26. Ciphering is started at an agreed ciphering activation time.

If the MMe 26 will not allow access by the UE 1, for example, for one of the reasons A1 to A6 listed above, the MMe 26 then issues an attach reject message, M9, together with a rejection type, which indicates the reason for the rejection. Radio resources are then released by transmission of messages M10.

According to the embodiment, because the attach reject message M9 is received only after ciphering and integrity protection have been established between the UE 1 and the MMe 26, the UE 1 can be confident that the attach reject message is legitimate. A non-legitimate MMe 26 would not have (or be able to obtain from AAA 22) information sufficient to allow integrity and ciphering to be established.

An attach reject message may still be accepted by the UE 1 when it is not ciphering and integrity protected. However, such attach reject messages may be treated differently. For example, an attach reject message that is not ciphering and integrity protected may be treated as a non-persistent rejection, whereas an attach reject message that is ciphering and integrity protected may be treated as a persistent rejection.

Subsequent to the initial attach request, it may be necessary for the UE 1 to perform further attach requests, for example when the location or tracking area of the UE 1 is changed. In accordance with this embodiment of the invention, any attach reject messages received are preferably ciphering and integrity protected in the manner described above. As before, attach reject messages that are ciphering and integrity protected are treated as persistent rejections, whereas attach reject messages that are not ciphering and integrity protected are treated as non-persistent rejections.

Although the first embodiment has been described with reference to UE 1 attaching to Mme 26 of a visited network, it is also applicable to UE 1 attaching to MMe 20 of its home network.

Alternatively, if an attach reject message is received that is not ciphering and integrity protected, an alternative form of authentication can be performed such as those to be discussed in the second embodiment. Ciphering and integrity protection may not be possible in certain circumstances, such as where there is a network problem and user subscription information is lost by the network.

Described above is an embodiment where authentication between the UE 1 and the MMe 26 is possible, which allows the verification of attach reject instructions. There are also various scenarios in which authentication of an attach reject message is not possible, such as:

B1: Rejection cause code—PLMN not allowed—When there is no roaming agreement between the visited network and the home network. In this case the visited network cannot access the Home AAA 22 server of the subscriber, and wants to stop the subscriber from continually requesting access to a network e.g. used to stop national roaming. In this scenario, the network does not know if the problem will be solved and therefore the UE 1 is rejected until the Forbidden PLMN field on the (U)SIM is cleared.

B2: Rejection cause code—Subscription Unknown in AAA—When the UE 1 has been miss-configured, or there has been a database error, the AAA 22 would not be able to retrieve the subscription information for the UE 1. When a SIM card is no longer associated to a subscriber the records (possibly after some quarantine period) are removed from the AAA 22, and if the subscriber inadvertently inserts this into a UE 1, again the network needs to be able to deactivate the UE 1. In this scenario, the network does not know if the problem will be solved and therefore the UE 1 is rejected until it is next power-cycled.

B3: Rejection cause code—MME/AAA Overload—When there is temporary problem with network connectivity or a node-overload the subscriber records may not be retrievable from the AAA 22. In this scenario, the network should assume that this is a temporary problem and therefore the UE 1 is told to back-off for a short time.

B4: Rejection cause code—No SIM—When there is no SIM present in the UE 1, the network needs to have the right to permanently reject the UE 1, even when the UE 1 wants to make emergency calls.

The main security concern is the handling of scenarios B1 and B2. It is important to recognise that these two scenarios differ in the node where the rejection is triggered: B1 is triggered in the Mobility Management entity (of the visited network), whereas B2 is triggered in the Home AAA 22.

Figure 4A:
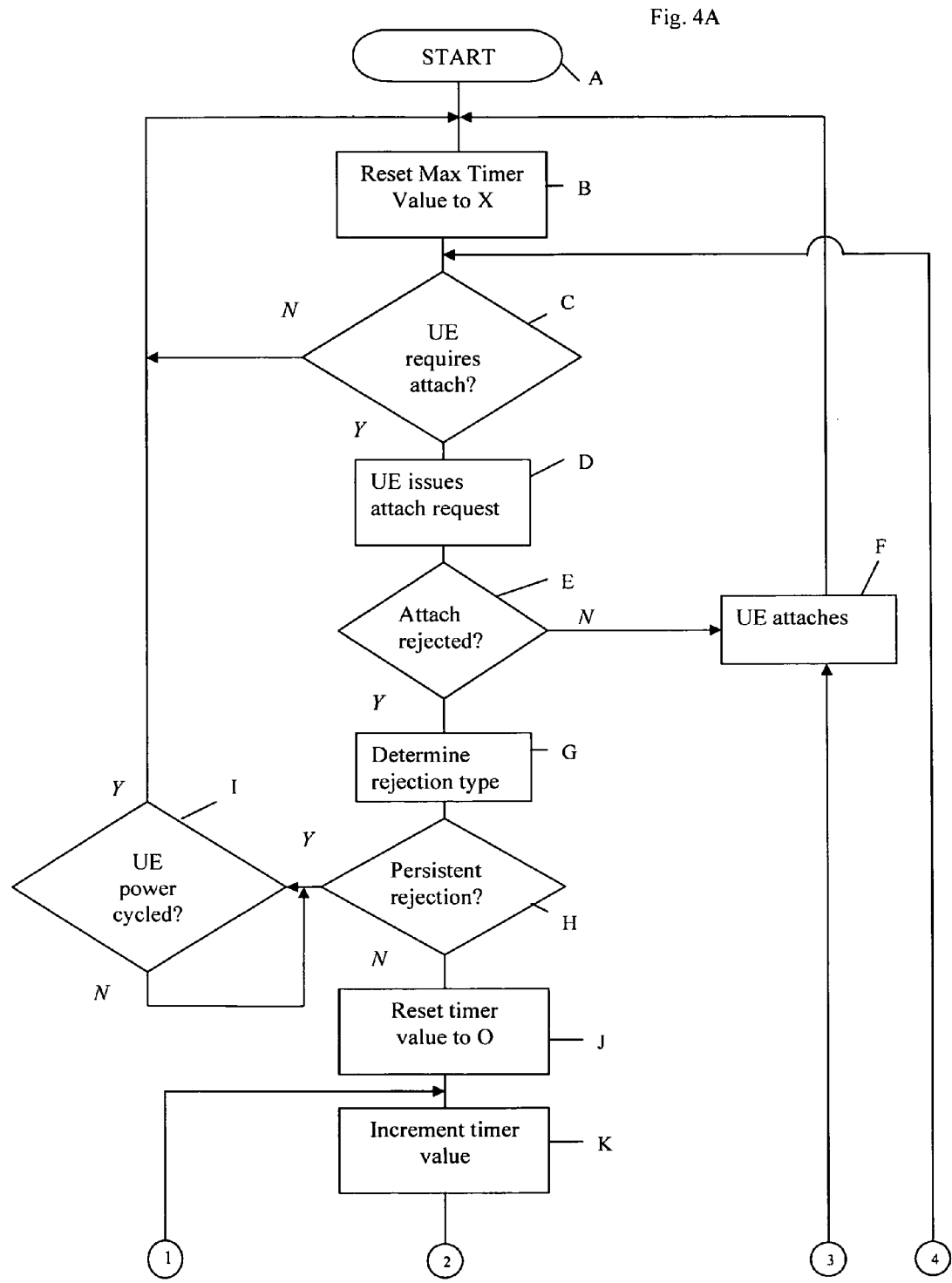
FIGS. 4A and 4B are a flow chart showing steps which manage attach requests received from applications running on the mobile device according to a second embodiment of the invention, which is particularly applicable to situations where authentication between the device and the MMe/AAA is not possible.
Figure 4B:
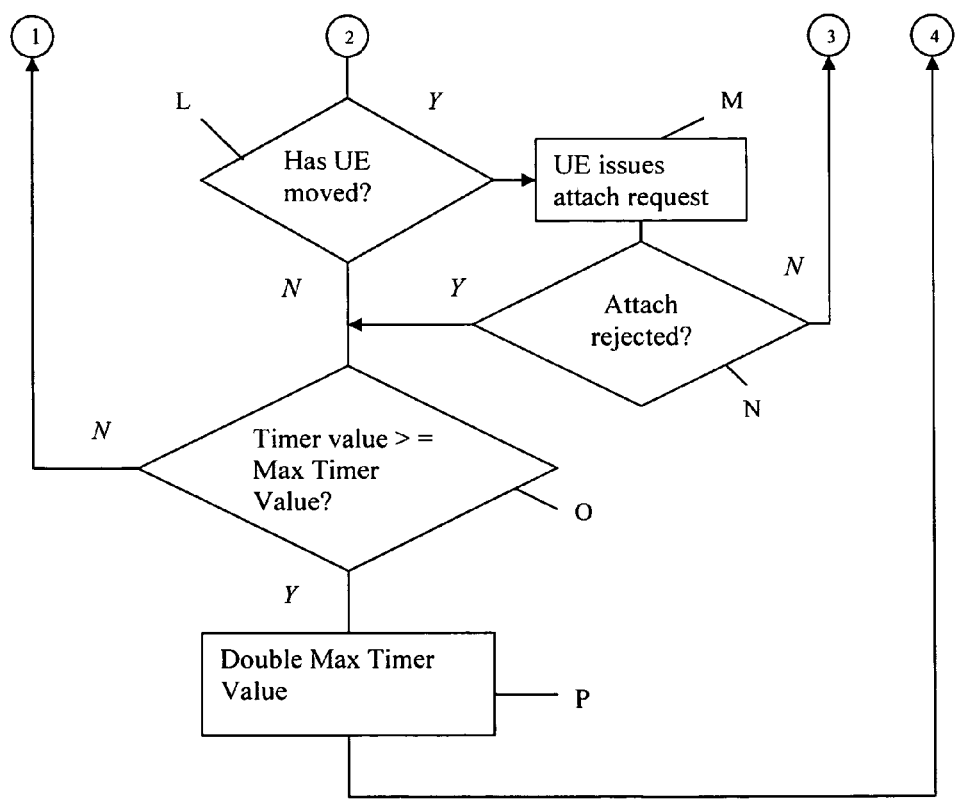

A second embodiment of the invention, now to be described, is particularly applicable to situations where authentication between the UE 1 and the MMe 26/AAA 22 is not possible, so that the reject instructions cannot be verified by authentication. The embodiment will initially be described with reference to the flow chart of FIG. 4 (comprising FIGS. 4A and 4B). The flow chart illustrates an algorithm implemented by a processor of the UE 1 which manages attach requests received from applications running on the UE 1 and controls in which circumstances such an attach request from an application results in an attach request being issued to the MMe 26.

The algorithm is started at step A.

At step B a parameter "Max Timer Value" is set to a predetermined value ("X"), for example, three minutes.

At step C it is determined whether any application running on the UE 1 requires an attach. If no attach is required, the algorithm returns to step B.

On the other hand, if at step C, it is determined that an attach is required by an application running on the UE 1, the algorithm allows the UE 1 to issue to the MMe 26 of the network an attach request at step D.

At step E it is determined whether the attach request is allowed by the MMe 26 of the network.

If the attach is accepted by the MMe 26 of the network, at step F, the UE 1 attaches to the network in a known manner and the algorithm returns to step B.

If, on the other hand, at step E, the attach request is rejected then at step G the rejection type is determined. That is, it is detected whether the rejection type is a persistent rejection or a non-persistent rejection. The determination of whether the rejection type is a persistent or non-persistent rejection will be made in different manners in dependence upon the rejection cause code received from the MMe 26 of the network. How different cause codes will be handled will be described later.

At step H, if the rejection type is a persistent rejection, then step I is performed. In step I it is determined whether the UE 1 is power cycled. No further attach requests to the MMe 26 of the network are permitted until the UE 1 has been power cycled. When the UE 1 has been power cycled, the algorithm returns to step B. (Power cycling of the UE 1 means that the UE 1 is switched off and on again.)

If the rejection is a non-persistent rejection a timer value is set to zero at step J.

At step K the timer value is incremented. For example, the algorithm could be arranged such that each time step K is performed the timer value as incremented by one second.

At step L it is determined whether the UE 1 has moved by a significant amount. What constitutes a significant amount could be selected in various ways. For example, it could be determined:

A) If the UE 1 changes the cell of a network in which it is positioned, this may be considered to be sufficient movement.

B) An alternative requirement may be for the UE 1 to have changed the cell of a network within which it is positioned, and for at least half of a particular number of the top ranked cells recorded by the UE 1 to have changed.

C) In a further alternative, a geographical hysteresis could be applied to the UE 1 using a Global Positioning System (GPS) input. In this manner it is determined whether the UE 1 has moved greater than a predetermined distance from the location at which the attach rejection (at step E) was received. If the UE 1 has moved this predetermined distance, this is considered to be sufficient movement.

If, at step L, sufficient movement is detected in one of the manners described above, or in an alternative manner, at step M the UE 1 issues an attach request to the MMe 26 of the network.

If, at step N, the attach request is accepted, the UE 1 attaches to the MMe 26 of the network at step F, and the algorithm returns to step B.

On the other hand, if, at step N, the attach is rejected, or if at step L it is determined that the UE 1 has not moved sufficiently, the step O is performed. At step O it is determined whether the timer value is greater than or equal to the parameter "Max Timer Value" (which has initially set at step B).

If the timer value is less than the parameter "Max Timer Value" the algorithm returns to step K.

On the other hand, if the timer value is greater than or equal to the parameter "Max Timer Value" step P is performed. At step P the parameter "Max Timer Value" is doubled. The algorithm then returns to step C.

According to the algorithm, when a persistent rejection is received (in step G), no further attach attempts to the MMe 26 of the network by the UE 1 are permitted until the UE 1 has been power cycled.

On the other hand, when a non-persistent rejection is received (in step G), the algorithm uses a timer to control when the next attach request to the MMe 26 of the network is permitted to be issued by the UE 1. By setting (and adjusting) the time between the attach request from the UE 1 to the MMe 26 of the network, the UE 1 may be allowed to make further attach attempts without requiring power cycling of the UE 1, whilst preventing excessive potentially unsuccessful attach attempts from being made within a very short period of time—which would be disruptive to the network and would also increase the power consumption of the UE 1. According to the algorithm, the timer counts to a parameter "Max Timer Value" and does not allow further attach attempts to the MMe 26 of the network until the parameter "Max Timer Value" is reached by the timer. Initially the parameter "Max Timer Value" is set to a relatively short time period, for example three minutes. After that time period has expired, the UE 1 is allowed to make a further attach attempt to the MMe 26 of the network. If that attempt is unsuccessful, the parameter "Max Timer Value" is increased (for example, it is doubled). A maximum value of the parameter "Max Timer Value" may be set, so that it never exceeds three hours, for example. According to the algorithm, when an attach attempt of the UE 1 to the MMe 26 of the network is accepted, the parameter "Max Timer Value" is reset to its original value (three minutes in the example) so that if future non-persistent rejections are subsequently received, further attach requests between the UE 1 and the MMe 26 of the network are allowed after a relatively short delay, which will subsequently increase.

However, because whether an attach attempt is rejected or not will depend upon the base station or access point within the RAN that the UE 1 uses to access the network, the algorithm advantageously further detects movement of the UE 1 during the periods that the timer is incrementing. If it is detected that the UE 1 is moved significantly during the period that the timer is incrementing, further attach attempt between the UE 1 and the MMe 26 of the network is permitted even though the timer has not reached the "Max Timer Value" parameter. In this way, attachment to the network by the UE 1 is not delayed if there is a location specific problem or a particular rogue base station or access point.

As an alternative to controlling attach attempts of the UE 1 to the network based on a timer and UE 1 movement, it is also possible to control attach attempts based on only the timer or on only movement.

How the algorithm of the flow chart of FIG. 4 is implemented on receipt of different rejection cause codes will now be discussed. The processes performed within step G of the flow chart of FIG. 4, where the rejection type is determined, will vary according to the cause code.

Figure 5:
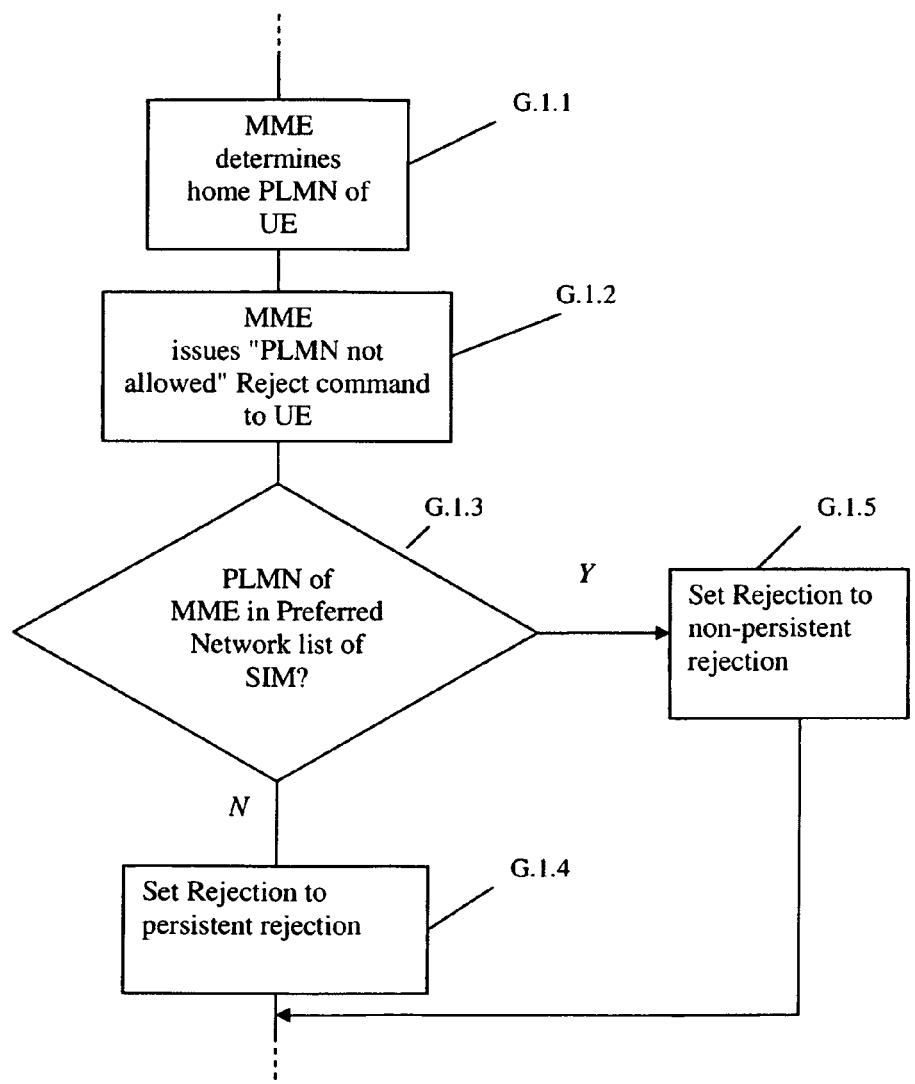
FIG. 5 is a flow chart showing steps that are performed within step G of the flow chart of FIG. 4 if the reject cause code is "PLMN not allowed"

FIG. 5 is a flow chart of an algorithm that is applied if the rejection cause code is "PLMN not allowed". Steps G.1.1 to G.1.5 of the flow chart of FIG. 5 are performed within step G of the flow chart of FIG. 4.

When the rejection cause code "PLMN not allowed" is received by the UE 1 from the MMe 26, this indicates that the UE 1 is not in its home network, and that there is no roaming agreement between the visited network and the home network. When there is no roaming agreement the visited network cannot access the home AAA 22 server of the UE 1. It is therefore desirable to prevent the UE 1 from continually requesting access to the visited network, as this would disrupt the visited network and also diminish the battery power of the UE 1 unnecessarily. Roaming agreements between networks are very common. However, there are still situations in which roaming agreements between networks are not present. For example, in most countries that are covered by a plurality of networks, roaming between those networks by a subscriber that has its home network one of those networks is generally not permitted.

Conventionally, when rejection with the cause code "PLMN not allowed" is received, the UE 1 is rejected with a persistent rejection, so that no further attach attempts are permitted until the UE 1 has been power cycled.

The flow chart of FIG. 5 provides improved handling of a rejection cause "PLMN not allowed" over the conventional arrangement described above.

At step G.1.1, the MMe 26 determines the home PLMN of the UE 1. This can be done, for example, by analysing the IMSI of the UE 1.

At step G.1.2 the MMe 26 issues a "PLMN not allowed" reject command to the UE 1 in response to an attach request (the attach request of step D in FIG. 4). This reject command will be issued if the home PLMN of the UE 1 is determined by the MMe 26 not to have a roaming agreement with the visited network of which the MMe 26 is a part.

At step G.1.3 the UE 1 receives the "PLMN not allowed" rejection from the MMe 26. The UE 1 determines whether the PLMN of the MMe 26 is in the "Preferred Network" list stored on the SIM of the device. The preferred network list is a list of networks to which the UE 1 will connect in preference to other networks. For example, networks on a preferred network list may be networks which are commonly owned, or have some special relationship, with the home network of the UE 1. The networks in the preferred network list may be able to provide better service than other networks, for example easy access to voice mail facilities and/or reduced call charges. The preferred network list is not a list of all networks with which the home network has a roaming agreement, but is a list of preferred networks provided by the home network and generally includes a network for each country where roaming is common.

If at step G.1.3 it is determined that the PLMN of the MMe 26 is not in the preferred network list of the SIM, this is an indication that the attach rejection could be genuine. At step G.1.4 the rejection then is set to a persistent rejection. Step H (and subsequent steps) of the flow chart of FIG. 4 are then performed.

On the other hand, if in step G.1.3 it is determined that the PLMN of the MMe 26 is in the preferred network list of the SIM, this is an indication that the attach rejection is not a genuine attach rejection (because networks on the preferred network list should always be networks with which the home network has a roaming agreement). At step G.1.5 the rejection is then set to a non-persistent rejection. Step H of the flow chart of FIG. 4 (and subsequent steps) are then performed.

At step I of the flow chart of FIG. 4, when the UE 1 is power cycled, the SIM of the UE 1 may be configured to check the status of certain fields on the SIM such as the Forbidden PLMN list and the field $EF_{loci}$ and to change their contents such that they do not block one attempt to access the network. ($EF_{loci}$ is the last location area in which the UE 1 was registered. It contains the network identity and the location area in the network.)

As an alternative to the algorithms of the flow charts of FIGS. 4 and 5, a roaming hub may be provided between a home network and a visited network with which the home network does not have a roaming agreement. The roaming hub allows signalling between the home network and the hub and between the hub and the visited network. The roaming hub would allow authentication of the attach rejection. If the attach rejection is authenticated via the hub, the rejection can be treated as a persistent rejection, whereas if authentication is not possible, the rejection is treated as a non-persistent rejection.

Figure 6:
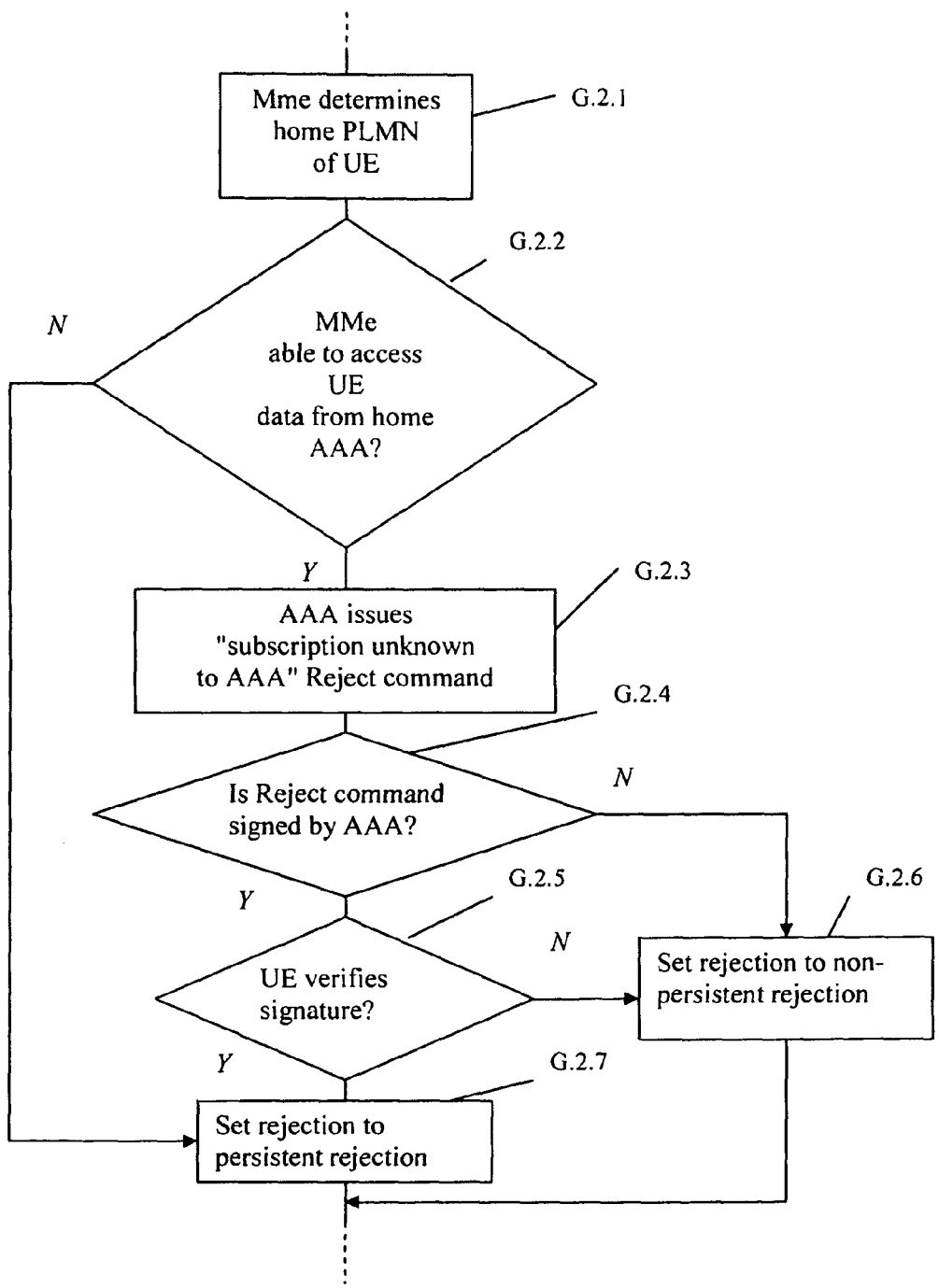
FIG. 6 is a flow chart showing steps that are performed within step G of the flow chart of FIG. 4 if the reject cause code is "subscription unknown in AAA"

The flow chart of FIG. 6 shows the steps performed within step G of the flow chart of FIG. 4 when the attach reject message has the cause "subscription unknown in AAA". Such a rejection cause occurs when the AAA 22 is unable to retrieve subscription information for the UE 1. This can occur, for example, when the UE 1 is mis-configured or when there is a database error in the HLR 10 or AAA 22. This may also occur when a SIM is no longer associated with a particular subscriber. This might occur when a subscriber's records are removed from the AAA 22 after issuance of the SIM (which might happen, for example, after a "quarantine" period of non-use of the SIM). Conventionally, if the AAA 22 is not able to retrieve subscription information for the UE 1/SIM, the network cannot allow the UE 1 to attach to the MMe 26 of the network, and therefore issues an attach rejection. Conventionally, this is a persistent rejection, so that further attach requests cannot be made by the UE 1 until the UE 1 is power cycled.

The flow chart of FIG. 6 provides an improved arrangement for handling attach rejections with the cause code "subscription unknown in AAA". At step G.2.1 the MMe 26 determines the home network of the UE 1.

At G.2.2 it is determined whether the MMe 26 is able to access any information about the UE 1 from the home AAA 22. Although the AAA 22 is not able to retrieve subscription information for the UE 1 in the conventional manner, as there is (or was) a trust relationship between the UE 1 and the home network, a reduced information set may allow the attach rejection to be authenticated to some extent. For example, the home network may sign the rejection code with a home network certificate.

Figure 7:
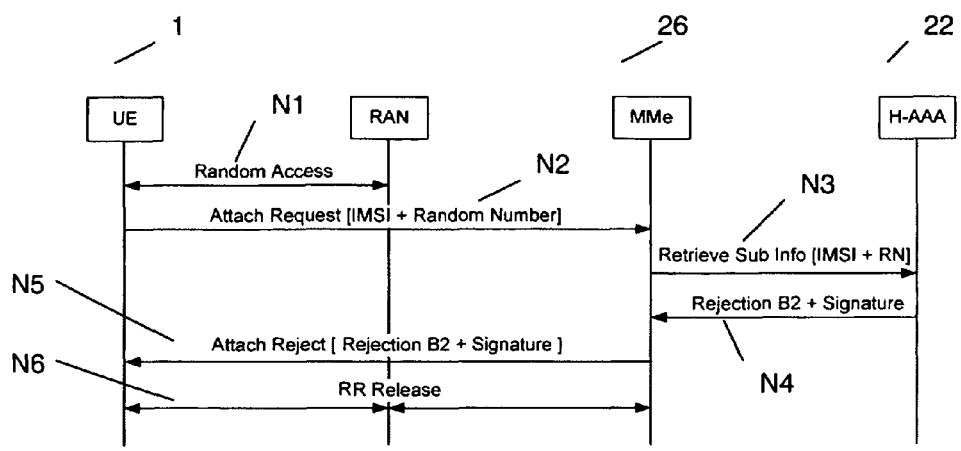
FIG. 7 shows the messages transmitted between the device, RAN, MMe and home AAA according to the FIG. 6 flow chart.

FIG. 7 shows the messages transmitted between the UE 1, RAN, MMe 26 and home AAA 22 according to this arrangement. In message N1 the UE 1 accesses the radio access network. In message N2 an attach request is generated by the UE 1 and sent to the MMe 26 via the RAN. The attach request includes the IMSI of the SIM associated with the UE 1, together with a random number generated by the UE 1. The attach request message may possibly also include the radio frame number where the attach request message was sent over the radio. The MMe 26 passes the IMSI and random number to the home AAA 22 in message N3 in a request to retrieve subscription information. The home AAA 22 attempts to receive the subscriber information but is unable to (for example, for one of the reasons described above). The home AAA 22 then issues, in message N4 a rejection message with rejection code "subscription unknown in AAA". However, in accordance with an important feature of this embodiment, the message N4 also includes a signature which is appended to the rejection code. The signature is created using the random number in conjunction with the IMSI and a home network security certificate at the home AAA 22. The rejection message and the signature is passed from the MMe 26 to the UE 1, via the RAN, in message N5. Radio resources are then released (message N6).

According to this embodiment, the UE 1 is configured with network security information, such as a public certificate, which enables it to verify the authenticity of the signature received in message N5. The public certificate stored in the UE 1 is updateable preferably, as such certificates are usually time limited. The certificate update may be performed through an over the air (OTA) process.

Authentication of a rejection may be performed in this manner when full authentication of the communication link between the UE 1 and the MMe 26 is possible (as in the first embodiment). This would be a quicker and simpler alternative to full authentication.

At step G.2.4 it is determined whether the reject command received in message N5 is signed by the AAA 22.

If at step G.2.4 it is determined that the reject command is signed by the AAA 22, the UE attempts to verify the signature in step G.2.5.

At step G.2.6, if the UE 1 is unable to verify the signature (step G.2.5), or if the reject command is not signed (step G.2.4), the rejection is unauthenticated and this indicates that the rejection might be bogus, and the rejection is set to a non-persistent rejection. Therefore, in this embodiment the UE 1 will also respond to normal unauthenticated rejections.

At step G.2.7, if the UE 1 is able to verify the signature (step G.2.5), the rejection is authenticated and the rejection is set to a persistent rejection. The rejection is also set to a persistent rejection if the MMe 26 is unable to access UE 1 data from the home AAA 22 (step G.2.2)

In an alternative arrangement, the UE 1 may be configured so that it only responds to authenticated rejections (and ignores unauthenticated rejections). The UE 1 or its associated SIM may include a parameter which is configured by the home network operator to indicate whether authentication of the rejection is mandatory, and step G.2.7 will only be performed if authentication of the rejection is not mandatory.

It should be noted that rejection cause code "PLMN not allowed" discussed above cannot be handled by requiring a signed rejection message because the UE 1 would need to be pre-configured with the public certificate of all potential networks (because no connection to the home network is possible). In theory, the attach reject message could include the public certificate of the UE's home network but this may not be practicable as it would make the attach reject message excessively long (which would cause difficulties, for example, it was transmitted by 3GPP control plane transport).

Figure 8:
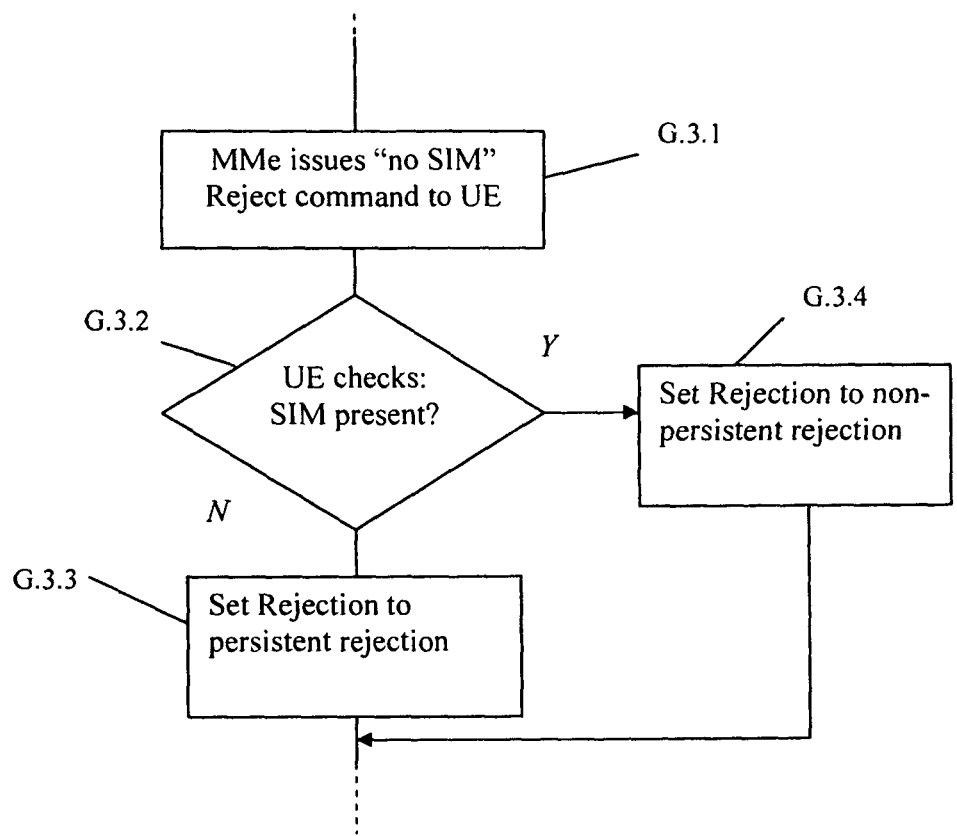
FIG. 8 is a flow chart showing steps that are performed within step G of the flow chart of FIG. 4 if the reject cause code is "no SIM".

The flow chart of FIG. 8 shows the steps performed within step G of the flow chart of FIG. 4 when the attach rejection message has the rejection cause "no SIM". Such rejection cause code is issued when an MMe 26 receives an attach request from a device that does not have a SIM present. The network needs to have the right to reject a device with no SIM present, even when the device wishes to make emergency calls.

At step G.3.1 the MMe 26 issues a "no SIM" reject command to the UE 1.

At step G.3.2 the UE 1 checks whether a SIM is in fact present.

At step G.3.3, if a SIM is absent, the rejection is set to a persistent rejection, as this verifies that the rejection is correct.

On the other hand, if a SIM is determined to be present, then at step G.3.4 the rejection may be set to a non-persistent rejection, as this indicates that the rejection may be bogus. Alternatively, if the SIM is present, the attach rejection may be ignored completely and further attach requests by the device to the MMe 26 may be allowed immediately without requiring the passage of a particular time period or movement of the device.

Another rejection code type mentioned above is "MMe/AAA overload". Such a network rejection code is issued when there is a temporary problem with network connectivity or a node (e.g. base station or access point) overload, which results in the records of the subscriber of the UE 1 not being retrievable from the AAA 22. Generally, this will be a temporary problem, and therefore further attach attempts should be allowed after a period of time. Advantageously, according to an embodiment of the invention, the time within which a subsequent attach request to the MMe 26 is allowed may be determined by a timer of the type described in relation to the flow chart of FIG. 4. That is, a timer which only allows attach attempts periodically, with the period between attach attempts increasing (doubling) in each subsequent period.

The invention claimed is:

1. A method of controlling an attach procedure of a device to a telecommunications network following receipt of an attach rejection from the telecommunications network, the method comprising:
   assessing authenticity of the attach rejection by determining whether there is a trust relationship between the device and the network that existed prior to the attach request;
   determining a length of a time period that must expire before performance of a subsequent attach attempt by the device to the network is permitted unless a particular event occurs within the time period, wherein the length of the time period is determined in dependence upon the authenticity assessment, wherein the length of the time period is increased in response to the rejection being deemed authentic and wherein the length of the time period further depends upon a number of prior attach rejections of the device from the telecommunications network; and
   performing the subsequent attach attempt in response to at least one of:
   (i) expiration of the time period; or
   (ii) occurrence of the particular event within the time period, wherein the particular event includes at least one of: power cycling of the device or a minimum threshold movement in location of the device.

2. The method of claim 1, wherein assessing the authenticity of the attach rejection includes determining the authenticity of the attach rejection in dependence upon whether the attach rejection was received via an authenticated communication link between the device and the network.

3. The method of claim 2, further comprising:
   providing a hub which connects the telecommunications network to an authentication server to enable establishment of the authenticated communication link.

4. The method of claim 1, wherein the attach rejection from the telecommunications network includes a rejection cause indicator, and wherein assessing the authenticity of the attach rejection includes determining the authenticity of the attach rejection by verifying the rejection cause indicator.

5. The method of claim 4, wherein the rejection cause indicator indicates that the device is not allowed to operate in the telecommunications network, and wherein verifying the rejection cause indicator includes comparing the network indicated in the rejection cause indicator with a list of pre-stored networks at the device.

6. The method of claim 4, wherein the rejection cause indicator indicates that the device lacks a subscriber identification module (SIM), and wherein verifying the rejection cause indicator includes determining at the device whether the SIM is in fact present.

7. A system for controlling an attach procedure of a telecommunications device to a telecommunications network following receipt of an attach rejection from the telecommunications network, the system comprising:
   an assessment device that assesses authenticity of the attach rejection by determining whether there is a trust relationship between the device and the network that existed prior to the attach request;

a time period-determining device that determines a length of a time period that must expire before performance of a subsequent attach attempt by the telecommunications device to the network is permitted unless a particular event occurs within the time period, wherein the length of the time period is determined in dependence upon the authenticity assessment, wherein the length of the time period is increased in response to the rejection being deemed authentic, and wherein the length of the time period further depends upon a number of prior attach rejections of the telecommunications device from the telecommunications network; and an attach device that performs the subsequent attach attempt in response to at least one of:
(i) expiration of the time period; or
(ii) occurrence of the particular event within the time period, wherein the particular event includes at least one of: power cycling of the telecommunications device or a minimum threshold movement in location of the telecommunications device.

8. The system of claim 7, wherein the assessment device assesses the authenticity of the attach rejection by determining the authenticity of the attach rejection in dependence upon whether the attach rejection was received via an authenticated communication link between the telecommunications device and the network.

9. The system of claim 8, further comprising:
a hub which connects the telecommunications network to an authentication server to enable establishment of the authenticated communication link.

10. The system of claim 7, wherein the attach rejection from the telecommunications network includes a rejection cause indicator, and wherein the assessment device assesses the authenticity of the attach rejection by determining the authenticity of the attach rejection by verifying the rejection cause indicator.

11. The system of claim 10, wherein the rejection cause indicator indicates that the telecommunications device is not allowed to operate in the telecommunications network, and wherein verifying the rejection cause indicator includes comparing the network indicated in the rejection cause indicator with a list of pre-stored networks at the telecommunications device.

12. The system of claim 10, wherein the rejection cause indicator indicates that the telecommunication device lacks a subscriber identification module (SIM), and wherein verifying the rejection cause indicator includes determining at the telecommunications device whether the SIM is in fact present.

* * * * *